United States Patent

[11] 3,556,127

[72] Inventor Ian Archie MacKinnon
Streetsville, Ontario, Canada
[21] Appl. No. 723,015
[22] Filed Apr. 22, 1968
[45] Patented Jan. 19, 1971
[73] Assignee Lely Ltd.
Burlington, Ontario, Canada
[32] Priority Apr. 21, 1967
[33] Netherlands
[31] 6705601

[54] DEVICES FOR DISTRIBUTING LIQUID
7 Claims, 2 Drawing Figs.
[52] U.S. Cl. .................................................. 137/205,
137/209; 141/59
[51] Int. Cl. .................................................. A01c 23/04
[50] Field of Search .................................................. 137/205,
202, 433, 209; 141/59; 73/327.5

[56] References Cited
UNITED STATES PATENTS
2,623,513 12/1952 Robertson .................. 137/205X
2,930,394 3/1960 Bellows ...................... 137/205
3,112,730 12/1963 Inscho ........................ 73/327.5
FOREIGN PATENTS
684,153 4/1964 Canada ....................... 137/205
Primary Examiner—Alan Cohan
Attorney—Mason, Mason and Albright ABSTRACT: According to the present invention, there is provided a device for distributing liquid comprising a container with which one end of a duct is connected through which air can be withdrawn from the container to draw liquid into the container, and a safety mechanism disposed between said end of the duct and the interior of the container for preventing overfilling of the container, the safety mechanism comprising a guide means around said end of the duct and inside which a float is provided that can be urged, by liquid drawn into the container, into a position in which it closes the duct.

PATENTED JAN 19 1971

3,556,127

INVENTOR
IAN ARCHIE MACKINNON
BY
Mason, Mason & Albright
Attorneys

DEVICES FOR DISTRIBUTING LIQUID

Figure 1:
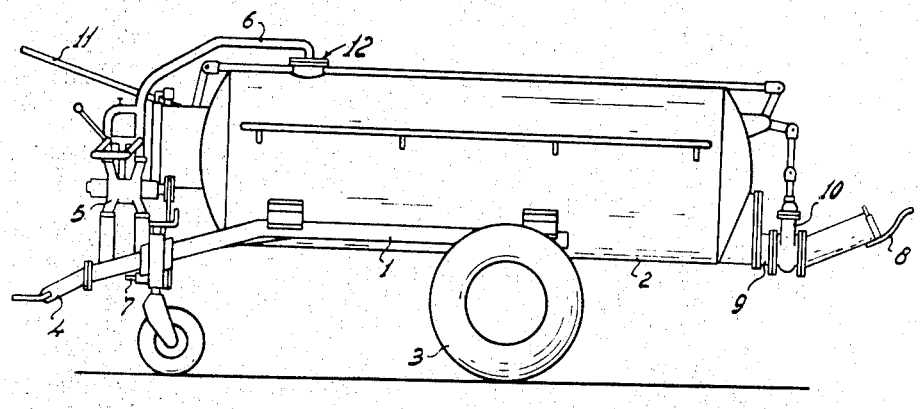

For a better understanding of the invention and to show how the same may be carried into effect, reference will now be made, by way of example, to the accompanying drawing, in which:

FIG. 1 is a side view of a transportable device for distributing liquid; and

Figure 2:
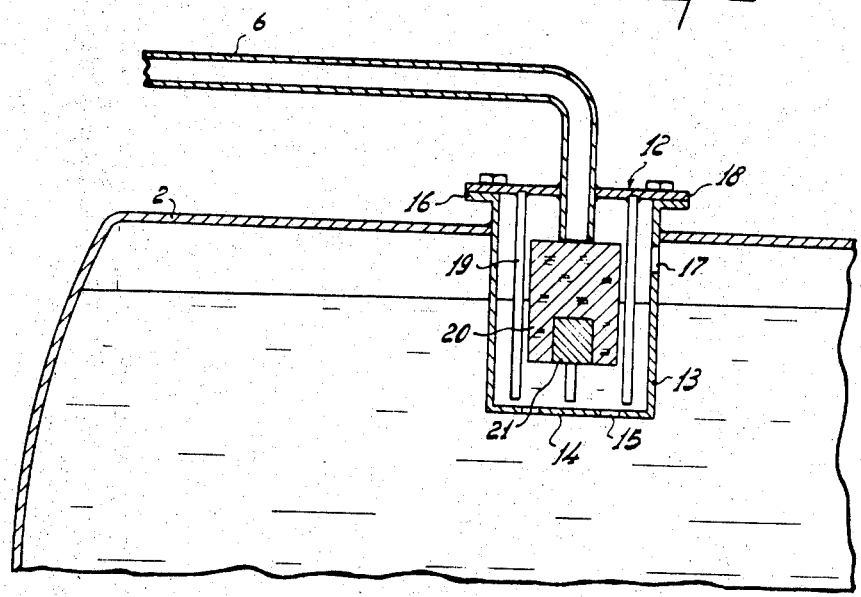

FIG. 2 is a sectional side view, on an enlarged scale, of a part of the device of FIG. 1. The device shown in the FIGS. has a frame 1 on which an elongated cylindrical liquid container 2 is mounted. The frame 1 has two ground wheels 3, only one of which can be seen in FIG. 1, near the rear and a jockey wheel near the front. At the front the frame has a drawbar 4 by which the device can be attached to a vehicle, for example, a tractor, to be transported. The front portion of the frame supports a pump 5 that communicates through a duct 6 with the container 2. The pump 5 is connected with a driving shaft 7 which can be coupled with the power takeoff shaft of the tractor propelling the device. On the rear of the liquid container 2 a spreading member 8 is provided that communicates with an outlet pipe 9 of the container 2. The outlet pipe 9 is provided with a closing member 10, which is linked by a rod system to a lever 11 at the front of the device.

The duct 6 communicates with an overflow 12 in the upper part of the con container 2. This overflow 12, which constitutes a safety member, is made up by a cylindrical ring 13 (FIG. 2) which is provided at its lower end with a bottom 14 having holes 15 therethrough. The overall height of the ring 13 is about 30cms. And the holes 15 have a diameter of about 20mm. The cylindrical ring 13 is located for the major portion in the container 2 and projects by a small portion above the container 2. The upper end of the ring 13 is provided with a collar 16. The ring 13 has an opening 17 in its curved wall inside the container 2 remote from the lower end of the ring and near the upper side of the container. A lid 18 removably fastened to the collar 16 and through which the duct 6 passes to terminate in the ring 18, has four guide bars 19 fastened to it that extend downwardly from the lid 18 to near the lower end of the ring 13. The guide bars 19, which may be of metal, are provided with a corrosion-resistant layer, for example of plastics. Within the four guide bars 19 a float 20 of a synthetic resin of light weight is provided. In the particular form being described the float is of a material, ethafoam, having a specific weight of 0.05. It may be made of another synthetic resin of low specific weight. The specific weight is preferably lower than 0.2. The float 20 is a solid body and is provided on its bottom with a weight 21, for example of metal, embedded in the material of the float. The holes 15 in the bottom 14 have a diameter of about 20mms. The height of the ring 13 is about 30cms.

The operation of the device described above is as follows. The container 2 is filled with liquid through the pipe 9 with the closing member 10 open, air being withdrawn from the container via the duct 6 by means of the pump 5 to effect this drawing-in of liquid. When the container 2 becomes filled to a predetermined level, the float 20 floating on the liquid, which has entered the ring 13 through the holes 15, will be urged against the duct 6, which is thus closed. The material of the float 20 is slightly flexible, so that it can readily block the opening of the duct 6 under the action of the upward pressure of the liquid. When the duct 6 is closed, air can no longer be drawn out of the container so that the container is not filled further. The float 20 remains in the guide bars 19 which guide the float so that it arrives in the correct manner at the opening of the duct 6. The plastic coverings of the bars 19 serve to prevent the float from sticking to the bars. The opening 17 in the ring 13 is placed so that it is above said predetermined level of the liquid. The opening 17 thus provides a satisfactory open communication between the space in the container 2 above the liquid and the space inside the ring 13 above the liquid.

THe construction described above provides a simple safety mechanism for preventing overfilling of the container. Although in the form described the lower end of the ring 13 is closed by an apertured bottom, it is alternatively possible merely to provide two crossing bars at the bottom of the ring 13. These bars may then serve for retaining the float 20 in the ring 13 when the liquid level drops below the ring 13. Furthermore, although four guide bars 19 have been described, the guide formed by the bars 19 can be made up of two or three or five or more such bars.

For distributing liquid previously drawn into the container 2, air can be pumped through the duct 6 into the container so that the liquid can be spread under pressure, via the closing member 10, by the spreading member 8, The device is particularly suitable for working thick liquids such as mixed manure. The float is not affected by manure or water so that it does not require much inspection and will continue operating reliably. The ring 13 encasing the guide bars 19 and the float 20 serves to prevent soil from sticking between the guide bars, the float and the duct 6.

I claim:

1. A device for loading and distributing liquid manure substances with pressure comprising a container having an overflow safety mechanism in its upper wall, a pump on said device in communication with an air duct which extends through said mechanism into the interior of said container whereby air can be introduced under pressure or withdrawn from the container through said duct, an outlet at the lower part of said container for sucking liquid substances within upon the withdrawal of air from said container, said outlet having spreading means for spreading substances out of said container under pressure, said safety mechanism positioned between said one end of said duct and the interior of said container for preventing overfilling of same, said safety mechanism comprising a guide means around said one end of said duct and a float being retained within said guide means whereby liquid drawn into said container urges said float upwardly into a position to close said one end of the duct, said float and said guide means being mounted inside an apertured cylindrical ring of said mechanism, and said ring having an opening in its sidewall above the predetermined level of liquid substances permitted by said safety mechanism to insure open communication between the interior of said ring and said container.

2. A device as claimed in claim 1, wherein said guide means extends downwardly and a support for the float is provided adjacent the lower end of said guide means.

3. A device as claimed in claim 2, wherein said float is made of a synthetic resin.

4. A device as claimed in claim 3, wherein said float has a metal weight at one end thereof.

5. A device as claimed in claim 3, wherein the specific weight of the float material is lower than 0.21.

6. A device as claimed in claim 2, wherein said guide means is comprised of a plurality of bars secured to a lid, said lid is removably mounted on the upper part of said container and said duct is connected to said lid.

7. A transportable device for loading and distributing liquid manure substances comprising a container having an overflow safety mechanism in its upper wall, a pump on said device in communication with an air duct, said air duct extending through said safety mechanism into the interior of said container whereby air can be introduced through one end of said duct to establish pressure within said container and withdrawn from the container to create a partial vacuum within same, an outlet with closure means at the lower part of said container for sucking manure substances within said container responsive to partial vacuum created within same, a spreading member associated with said outlet for distributing manure substances from said container under the pressure established by said pump, said safety mechanism being positioned substantially within said container at the entrance of said duct into said container for preventing the overfilling of same, said safety mechanism including a ring with a float, said ring having an apertured bottom, said float being loosely retained by guide means depending from the lid of said ring whereby said float can move upwardly to close the entrance of said duct into said container and prevent the overfilling of said container, an opening in the sidewall of said ring adjacent to the upper wall of said container, said opening being located above the level of liquid substances when said float has closed the entrance of said duct.